United States Patent
Bellifemine et al.

(10) Patent No.: US 8,156,231 B2
(45) Date of Patent: Apr. 10, 2012

(54) REMOTE ACCESS SYSTEM AND METHOD FOR ENABLING A USER TO REMOTELY ACCESS TERMINAL EQUIPMENT FROM A SUBSCRIBER TERMINAL

(75) Inventors: Fabio Bellifemine, Turin (IT); Rosalba Bochicchio, Naples (IT); Giovanni Caire, Turin (IT); Paolo Di Tria, Turin (IT); Tiziana Trucco, Turin (IT); Giosuè Vitaglione, Naples (IT)

(73) Assignee: Telecom Italia S.p.A., Milan (IT)

( * ) Notice: Subject to any disclaimer, the term of this patent is extended or adjusted under 35 U.S.C. 154(b) by 592 days.

(21) Appl. No.: 11/794,248

(22) PCT Filed: Dec. 28, 2004

(86) PCT No.: PCT/EP2004/053717
§ 371 (c)(1),
(2), (4) Date: Feb. 28, 2008

(87) PCT Pub. No.: WO2006/069599
PCT Pub. Date: Jul. 6, 2006

(65) Prior Publication Data
US 2009/0019134 A1    Jan. 15, 2009

(51) Int. Cl.
*G06F 15/16* (2006.01)
(52) U.S. Cl. ......... 709/229; 709/217; 709/225; 713/182
(58) Field of Classification Search .......... 709/217–219, 709/225, 229; 713/182
See application file for complete search history.

(56) References Cited

U.S. PATENT DOCUMENTS
5,839,072 A * 11/1998 Chien ........................... 455/445
(Continued)

FOREIGN PATENT DOCUMENTS
EP    1 126 675 A2    8/2001
(Continued)

OTHER PUBLICATIONS

Srisuresh, Network Working Group, RFC 2888 "Secure Remote Access with L2TP", IETF Standard, Internet Engineering Task Force, IETF, CH, XP015008671, pp. 1-20, (Aug. 2000).

(Continued)

*Primary Examiner* — Mohamed Ibrahim
(74) *Attorney, Agent, or Firm* — Finnegan, Henderson, Farabow, Garrett & Dunner, L.L.P.

(57) ABSTRACT

A method for enabling a subscriber terminal to remotely access terminal equipment, the terminal equipment storing identification data of the subscriber terminal, and the subscriber terminal being subscribed to a communication network and to a remote access service, wherein the method includes: receiving a request for authentication from the terminal equipment, the request for authentication including identification data of the subscriber terminal; receiving a request for access to the terminal equipment from the subscriber terminal; authenticating the subscriber terminal based on information from the communications network; forwarding the request for authentication from the terminal equipment to the subscriber terminal upon authenticating the subscriber terminal, the subscriber terminal processing the request for authentication to authenticate the terminal equipment; receiving an authentication notification from the subscriber terminal; forwarding the authentication notification from the subscriber terminal to the terminal equipment, the terminal equipment processing the authentication notification to authenticate said subscriber terminal; receiving an authentication notification from the terminal equipment; and enabling the subscriber terminal to remotely access the terminal equipment upon receiving the authentication notification from the terminal equipment.

24 Claims, 2 Drawing Sheets

U.S. PATENT DOCUMENTS

| | | | |
|---|---|---|---|
| 5,974,463 A * | 10/1999 | Warrier et al. | 709/225 |
| 6,061,650 A | 5/2000 | Malkin et al. | |
| 7,082,535 B1 * | 7/2006 | Norman et al. | 713/163 |
| 7,685,629 B1 * | 3/2010 | White et al. | 726/2 |
| 2001/0037394 A1 * | 11/2001 | Yoshimura et al. | 709/228 |
| 2002/0091848 A1 * | 7/2002 | Agresta et al. | 709/231 |
| 2002/0147926 A1 * | 10/2002 | Pecen et al. | 713/201 |
| 2003/0084169 A1 | 5/2003 | Zhu et al. | |
| 2004/0003190 A1 * | 1/2004 | Childs et al. | 711/163 |
| 2004/0172531 A1 * | 9/2004 | Little et al. | 713/155 |
| 2005/0176407 A1 * | 8/2005 | Tuomi et al. | 455/411 |

FOREIGN PATENT DOCUMENTS

| | | |
|---|---|---|
| EP | 1 150 474 B1 | 10/2001 |
| WO | WO 01/74023 A2 | 10/2001 |
| WO | WO 03/088577 A1 | 10/2003 |

OTHER PUBLICATIONS

Malkin, "Dial-in Virtual Private Networks Using Layer 3 Tunneling", Local Computer Networks, IEEE Comput. Soc, U.S., XP010252462, pp. 555-561, (Nov. 2, 1997).

\* cited by examiner

REMOTE ACCESS SYSTEM AND METHOD FOR ENABLING A USER TO REMOTELY ACCESS TERMINAL EQUIPMENT FROM A SUBSCRIBER TERMINAL

CROSS REFERENCE TO RELATED APPLICATION

This application is a national phase application based on PCT/EP2004/053717, filed Dec. 28, 2004.

TECHNICAL FIELD OF THE INVENTION

The present invention relates in general to remotely managing data stored in a networked device via another networked device, and in particular to a remote access system and a method for enabling a user to remotely access a terminal equipment, such as for example a personal computer, from a subscriber terminal, such as for example a mobile phone.

BACKGROUND ART

Remote access systems allow users to access a computer or a computer network from a remote location using a remote computer. For example, employees of businesses can use remote access systems to gain access to their business computers or their business computer network from various remote locations such as their homes, a branch office, or while traveling.

There are several remote access systems that are commercially available today such as pcAnyWhere produced by Symantec Corporation, Carbon Copy produced by Compaq Corporation, and Timbuktu produced by Netopia. These remote access systems include software that must be installed on a target computer, such as a user's office computer or office computer system, and software that must be installed on a remote computer, such as a user's home computer.

One disadvantage of the conventional remote access systems described above is that it is difficult to install and configure the software on the remote computers. The user must install software on the remote computer and then perform a configuration process, which typically requires entering information, such as the target computer's Internet Protocol (IP) address and a telephone number associated with the target computer's modem. Many users have difficulty performing these configuration steps and in some cases fail to perform these configuration steps successfully. As a result, the user will not be able to access the target computer. Even if the user is able to perform these configuration steps, it may take an unacceptable amount of time to complete these steps. Another disadvantage of conventional remote access systems is that they do not support dynamic IP addressing systems that are widely used in various network environments. Yet another disadvantage of conventional remote access systems is that it is often difficult or impossible to access computers that are located behind firewalls using such conventional remote access systems. Yet another disadvantage of conventional remote access systems is that they do not allow applications to be remotely accessed during data conferences.

US2003/0084169A1 discloses a system and a method for accessing a target computer from a remote location using a remote computer. To access the target computer a user first accesses a central computer system (typically the computer of an Internet service provider) which performs also the function of user authentication. Once it is determined that the user has permission to access the target computer, the user can access the target computer via the central computer system and may control the applications present on the target computer and carry out file transfer from the remote computer.

However, the Applicant has observed that this system does not envisage any mechanism for remotely accessing the target computer from a mobile terminal, in particular a subscriber terminal such as a mobile phone, and in addition the setup thereof requires that an authentication procedure be made at a central or server computer (entering certain information such as username and password, possibly a credit-card number for the billing, an e-mail address, etc.) in order to obtain a new user account.

Further, WO01/74023 discloses a method and an apparatus for remotely managing data in a network system comprising at least one mobile device (e.g. a personal digital assistant, a cellular phone, a two-way pager, or a mobile computer) and at least one server computer connected via an interconnection fabric, wherein the mobile device is registered with the server and configured to issue commands to a service using electronic mail messages or some other viable data transmission mechanism. The service responds to the commands by interfacing with the server computer to perform the requested action on behalf of the mobile device. The command may for example regard management of the e-mail (sending, forwarding, erasing) or else querying of a database or any other action that can be performed on the server and generate a result that may be displayed on the mobile device.

The Applicant has observed that in this system, both the mobile device and the server computer are identified by their e-mail addresses, and therefore a drawback of this system is security. In fact, in the (SMTP) protocol used by the e-mail, it is extremely easy to change the "from" field, i.e., the sender of the e-mail, and therefore the service could receive and execute malicious commands. Furthermore, the Applicant has noted that also this system requires that a registration procedure be made at a server computer in order to obtain a user account. The Applicant has also noted that, being based on the SMTP protocol, this system is slow to execute users' requests and therefore it is not able to be used with services requiring a quick reaction (for example a user requesting access to a remote directory).

Additionally, WO03/88577 describes a method for authenticating a user of a data transfer device (such as a terminal in a wireless local area network, i.e. WLAN). The method comprises: setting up a data transfer connection from the data transfer device to a service access point. Next, identification data of the mobile subscriber (for example an MSISDN) are inputted to the service access point. This is followed by checking from the mobile communication system whether the mobile subscriber identification data contains an access right to the service access point. If a valid access right exists, a password is generated, then transmitted, for example via SMS, to a subscriber terminal (for example a GSM mobile phone) corresponding to the mobile subscriber identification data, and login from the data transfer device to the service access point takes place with the password transmitted to the subscriber terminal.

The Applicant has noted that a disadvantage of this system is that access to the service requires two distinct interactions of the user, i.e., a first connection to the service to enter his MSISDN and a second connection to the service after receipt of the password for using the service, that can even be distant in time on account of the latencies inherent in SMS communication. Furthermore, the Applicant has observed that there are no means to make sure that the user will have available his own mobile phone, on which he will receive the password, at the moment when he wishes to access the service. The Applicant has also noted that this system requires that a registration procedure be made in order to obtain a user password.

OBJECT AND SUMMARY OF THE INVENTION

The object of the present invention is therefore to provide a remote access system and method for enabling a user to remotely access a terminal equipment, via a subscriber terminal, which are easy to implement, install and configure, which guarantee privacy and security of the communication between the terminal equipment and the subscriber terminal, and which allow billing to be made without the need for the user to have a new dedicated account.

The object is achieved by the present invention in that it relates to a remote access method for enabling a user to remotely access terminal equipment (TE) from a subscriber terminal (ST) via a remote access system (RAS), said terminal equipment (TE) storing identification data (MSISDN) of said subscriber terminal (ST), said method being characterized by:

receiving a request for authentication (AUTH_REQUEST) from said terminal equipment (TE), said request for authentication (AUTH_REQUEST) including said identification data (MSISDN) of said subscriber terminal (ST);

receiving a request for access (ACCESS_REQUEST) to said terminal equipment (TB) from said subscriber terminal (ST);

verifying that said subscriber terminal (ST) is subscribed to said remote access system (RAS);

authenticating said subscriber terminal (ST) based on information from a communications network (CN);

forwarding said request for authentication (AUTH_REQUEST) from said terminal equipment (TE) to said subscriber terminal (ST), said subscriber terminal (ST) processing said request for authentication (AUTH_REQUEST) to authenticate said terminal equipment (TE);

receiving an authentication notification (AUTH_RESP) from said subscriber terminal (ST);

forwarding said authentication notification (AUTH_RESP) from said subscriber terminal (ST) to said terminal equipment (TE), said terminal equipment (TE) processing said authentication notification (AUTH_RESP) to authenticate said subscriber terminal (ST); and receiving an authentication notification (AUTH_RESP) from said terminal equipment (TE); and enabling said subscriber terminal (ST) to remotely access said terminal equipment (TE).

In preferred embodiments of the method of the invention, authenticating said subscriber terminal (ST) based on information from said communications network (CN) may include:

verifying that said subscriber terminal (ST) has been previously authenticated by said communications network (CN), or verifying that said subscriber terminal (ST) has been previously authenticated by said communications network (CN) and may include:

verifying that said identification data (MSISDN) of said subscriber terminal (ST) has been stored by said communications network (CN) in a database (DB);

wherein said identification data may include at least MSISDN of said subscriber terminal (ST).

The method of the present invention may further include:
storing said request for authentication (AUTH_REQUEST) until said subscriber terminal (ST) has been authenticated by said communications network (CN); or
verifying that said subscriber terminal (ST) is subscribed to said remote access system (RAS) and may include:
extracting said identification data of said subscriber terminal (ST) from said request for authentication (AUTH_REQUEST); and
verifying that said extracted identification data are associated to a subscriber of said remote access system (RAS).
The method of the present invention may further include:
rejecting said request for authentication (AUTH_REQUEST) if said identification data are not associated to a subscriber of said remote access system (RAS); or
may further include:
sending an authentication refusal (AUTH_REFUSED) to said terminal equipment (TE) if said identification data are not associated to a subscriber of said remote access system (RAS); or
may further include:
rejecting any subsequent request for authentication (AUTH_REQUEST) from said terminal equipment (TE) for a time span if said identification data are not associated to a subscriber of said remote access system (RAS).

In other preferred embodiments of the method of the present invention, said request for authentication (AUTH_REQUEST) from said terminal equipment (TE) may include data encrypted using user access credentials entered in said terminal equipment (TE), and wherein said subscriber terminal (ST) authenticates said terminal equipment (TE) based on said encrypted data in said request for authentication (AUTH_REQUEST); or
authenticating said terminal equipment (TE) based on said encrypted data may include:
decrypting said encrypted data in said request for authentication (AUTH REQUEST) by using user access credentials entered in said subscriber terminal (ST);
encrypting said decrypted data using said user access credentials entered in said subscriber terminal (ST);
comparing said encrypted data in said request for authentication (AUTH_REQUEST) with said data encrypted using said user access credentials entered in said subscriber terminal (ST); and
authenticating said terminal equipment (TE) if said comparison has a positive outcome; and
may further include:
rejecting said request for authentication (AUTH_REQUEST) upon receiving a non-authentication notification (NON_AUTH_RESP) from said subscriber terminal (ST); or
may further include:
sending an authentication refusal (AUTH_REFUSED) to said terminal equipment (TE) upon receiving a non-authentication notification (NON_AUTH RESP) from said subscriber terminal (ST); or
may further include:
rejecting any subsequent request for authentication (AUTH_REQUEST) from said terminal equipment (TE) for a time span upon receiving said non-authentication notification (NON_AUTH_RESP) from said subscriber terminal (ST).

In other preferred embodiments of the present invention, said authentication notification (AUTH_RESP) from said subscriber terminal (ST) may include data encrypted using said access credentials entered in said subscriber terminal (ST), and wherein said terminal equipment (TE) authenticates said Subscriber Terminal (ST) based on said encrypted data in said authentication notification (AUTH_RESP);
wherein authenticating said subscriber terminal (ST) based on said encrypted data in said authentication notification (AUTH_RESP) may include:
decrypting said encrypted data in said authentication notification (AUTH_RESP) by using said access credentials entered in said terminal equipment (TE);
encrypting said decrypted data using said access credentials entered in said terminal equipment (TE);
comparing said encrypted data in said authentication notification (AUTH_RESP) with said data encrypted using said access credentials entered in said terminal equipment (TE); and
authenticating said subscriber terminal (TE) if said comparison has a positive outcome; and
may further include:
rejecting said request for access (AUTH_ACCESS) upon receiving a non-authentication notification (NON_AUTH_RESP) from said terminal equipment (TE); or
may further include:
sending an authentication refusal (AUTH_REFUSED) to said subscriber terminal (ST) upon receiving said, non-authentication notification (NON_AUTH_RESP) from said terminal equipment (TE); or
may further include:
rejecting any subsequent request for access (AUTH_ACCESS) from said subscriber terminal (ST) for a time span upon receiving said non-authentication notification (NON_AUTH_RESP) from said terminal equipment (TE).

In still other preferred embodiments of the present invention, said remote access system (RAS) stores an access control list (ACL) containing access authorizations for different subscriber terminals (ST), each access authorization specifying resources of said terminal equipment (TE) to which a corresponding subscriber terminal (ST) may access;
wherein enabling said subscriber terminal (ST) to remotely access said terminal equipment (TB) may include:
determining the access authorization associated with said subscriber terminal (ST) in said access control list (ACL); and
enabling said subscriber terminal (ST) to access the resources of said terminal equipment (TE) specified in said access authorization.

The object of the present invention is also achieved by a remote access system (RAS) for enabling a user to remotely access terminal equipment (TE) from a subscriber terminal (ST), said subscriber terminal (ST), said terminal equipment (TE) and said remote access system (RAS) being configured to implement the remote access method of the present invention as set forth above.

The object of the present invention is also achieved by software modules able, when loaded in terminal equipment (TE), a subscriber terminal (ST), and a remote access system (RAS) for enabling a user to remotely access said terminal equipment (TE) from said subscriber terminal (ST), to cooperate in implementing the remote access method according to the method of the present invention as described above.

It is a further object of the present invention to provide a mobile office service for enabling a user to remotely control terminal equipment (TE) from a subscriber terminal (ST) via a remote access system (RAS), said terminal equipment (TE) storing identification data (MSISDN) of said subscriber terminal (ST), said mobile office service being characterized by:
generating a request for authentication (AUTH_REQUEST) at said terminal equipment (TE), said request for authentication (AUTH_REQUEST) including said identification data (MSISDN) of said subscriber terminal (ST);
sending said request for authentication (AUTH_REQUEST) from said terminal equipment (TE) to said remote access system (RAS);
generating at said subscriber terminal (ST) a request for access (ACCESS_REQUEST) to said terminal equipment (TE);
sending said request for access (ACCESS_REQUEST) from said subscriber terminal (ST) to said remote access system (RAS);
verifying at said remote access system (RAS) that said subscriber terminal (ST) is subscribed to said remote access system (RAS);
authenticating at said remote access system (RAS) said subscriber terminal (ST) based on information from a communications network (CN);
sending said request for authentication (AUTH_REQUEST) to said subscriber terminal (ST);
processing at said subscriber terminal (ST) said request for authentication (AUTH_REQUEST) to authenticate said terminal equipment (TE);
generating an authentication notification (AUTH_RESP) at said subscriber terminal (ST);
sending said authentication notification (AUTH_RESP) from said subscriber terminal (ST) to said terminal equipment (TE) via said remote access system (RAS);
processing at said terminal equipment (TE) said authentication notification (AUTH_RESP) to authenticate said subscriber terminal (ST); and
establishing a secure communication between said subscriber terminal (ST) and said terminal equipment (TE).

In preferred embodiments of the mobile office service, establishing a secure communication may include:
generating a common session key ($K_{sess}$) at said subscriber terminal (ST) and said terminal equipment (TE); and
encrypting communication between said subscriber terminal (ST) and said terminal equipment (TE) by using said common session key ($K_{ess}$); and
said remote access system (RAS) may store an access control list (ACL) containing access authorizations for different subscriber terminals (ST), each access authorization specifying resources of said terminal equipment (TE) to which a subscriber terminal (ST) may access;
wherein establishing a secure communication may include:
determining the access authorization associated with said subscriber terminal (ST) in said access control list (ACL); and
enabling said subscriber terminal (ST) to access the resources of said terminal equipment (TE) specified in said access authorization.

For the purposes of the present description, the term "Terminal Equipment" refers to any personal device that is accessible via an IP network, such as for example a personal computer, laptop or notebook linked to the IP network via a fixed or wireless link or a PDA or a smart phone linked to the IP network via a wireless link, and the term "Subscriber Terminal" refers to any mobile device, such as for example a mobile phone, able to be connected to a Mobile Communication Network.

For the purposes of the present description, the term "Mobile Communication Network" refers to any Communication Network able to use an authentication mechanism for authenticating Subscriber Terminals wireless connected to it (for example GPRS, EDGE, UMTS, WLAN Networks).

In a preferred embodiment, the present invention makes the mutual authentication between the Subscriber Terminal and the Terminal Equipment easy and immediate because the owner of the Subscriber Terminal is authenticated and hence authorized to access the Terminal Equipment reusing the account that the Mobile Communications Operator has assigned to the Subscriber Terminal. To be enabled to access the Terminal Equipment, it is therefore sufficient for the user to provide the Subscriber Terminal with a connection to a Mobile Communication Network (for example GPRS, EDGE, UMTS).

Advantageously, access credentials (i.e. the passwords) used to encrypt the communications between the Subscriber Terminal and the Terminal Equipment are not registered on any central server and therefore they are modifiable at any moment by the user acting only on the Subscriber Terminal and Terminal Equipment, thus guaranteeing confidentiality of the information exchanged.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Figure 1:
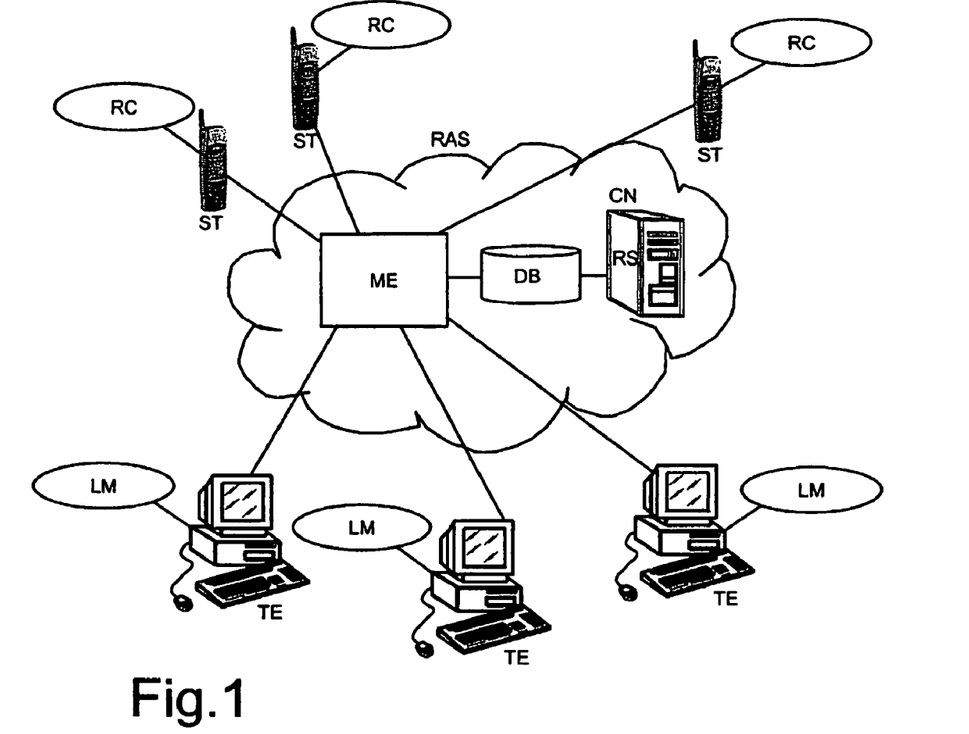
FIG. 1 shows a block diagram of a remote access system for enabling a user to remotely access a terminal equipment via a subscriber terminal, according to an embodiment the present invention.

FIG. 1 shows a block diagram of a Remote Access System (RAS) which provides a so-called Mobile Office Service, i.e., a service which enables a user to remotely access his/her own Terminal Equipment (TE) via his/her own Subscriber Terminal (ST).

The Subscriber Terminal can include a GPRS-enabled or EDGE-enabled mobile equipment provided with a Subscriber Identity Module (SIM) card or a UMTS-enabled mobile equipment provided with a Universal Subscriber Identity Module (USIM) card. SIM/USIM cards store identification data of the subscriber of the mobile communications system, namely the IMSI (International Mobile Subscriber Identity)/IMUI (International Mobile User Identity), which are mapped by the operator to the Mobile Subscriber International Integrated Services Digital Network Number (MSISDN) that identifies the subscriber globally and unambiguously. The MSISDN consists of three parts: country code, national network identifier and subscriber number.

In order to remotely access the Terminal Equipment, the Subscriber Terminal has to be subscribed to a Mobile Communications Network (CN), such as GPRS (General Packet Radio System) or EDGE (Enhanced Data for GSM Evolution) or UMTS (Universal Mobile Telecommunications System), and be authorized to use the Mobile Office Service provided by the Remote Access System.

The Mobile Communication Network can include a Radius (Remote Authentication Dial-In User Service) Server (RS), which is a security distributed system that secures remote access to networks and network services against unauthorized access, and to which user authentication is delegated.

According to a preferred embodiment of the present invention, the Remote Access System includes a Mediator software application, hereinafter referred to as Mediator (ME), running on a server at the Service Centre and communicating with the Radius Server; and an Authentication Database (DB) accessible by both the Radius Server and the Mediator, and containing information on the Subscriber Terminals connected to the Mobile Communications Network and authenticated by the Radius Server.

In addition, the Subscriber Terminal is provided with a Remote Control software application, hereinafter referred to as Remote Controller (RC), running on the Subscriber Terminal and enabling the user to remotely access the Mediator for controlling the Terminal Equipment via the Mediator itself, and the Terminal Equipment is provided with a Local Manager software application, hereinafter referred to as Local Manager (LM), running on the Terminal Equipment and enabling the Mediator to remotely access the Terminal Equipment for executing the commands received from the Subscriber Terminal.

Preferably, the Mediator is a software application developed using a open source platform for peer-to-peer agent-based applications implemented in Java language and known as JADE (Java Agent Development Framework; the related documentation being accessible on the Internet, as of the filing date of the present application, at the address http://jade.tilab.com). Jade simplifies the implementation of multi-agent systems through a middleware that complies with the FIPA (Foundation for Intelligent Physical Agents) specifications and through a set of graphical tools that supports the debugging and deployment phases. The agent platform can be distributed across machines (which not even need to share the same operating system) and the configuration can be controlled via a remote graphical user interface (GUI). The configuration can be even changed at run-time by moving agents from one machine to another one, as and when required. The minimal system requirement to implement Jade is the version 1.4 of JAVA™ (the run time environment or the Java Development Kit).

The Mediator can communicate with the Remote Controller and the Local Manager using, for example, a Security Session Layer (SSL) protocol for authentication and confidentiality constraints between the Mediator and the Remote Controller and between the Mediator and the Local Manager.

An appropriate user interface on the Subscriber Terminal enables the user to access the functions of the Remote Controller for sending commands to the Terminal Equipment, for example in order to download user own files from the Terminal Equipment onto the Subscriber Terminal, to enable/disable sharing of remote files with other users, and to download files that other users have shared with him/her.

The Local Manager is able to execute commands received from the Subscriber Terminal via the Mediator, to manage requests from other users, to discriminate received commands on the basis of the sender, and to manage an access control list for the access to the resources of the Terminal Equipment.

After the Remote Controller and the Local Manager have been installed on the Subscriber Terminal and the Terminal Equipment, respectively, the two software modules may be configured by entering user access credentials, such as for example a password in the Subscriber Terminal, and the same user access credentials, i.e. the same password, and the MSISDN of the Subscriber Terminal in the Terminal Equipment The Remote Controller and the Local Manager may be configured either to store the user passwords and the MSISDN of the Subscriber Terminal, which therefore will never be requested any more to the user, or to request input of the user passwords and the MSISDN of the Subscriber Terminal at each execution. In any case, the password is not communicated/transferred outside the two software applications, and consequently, it cannot be discovered even by the Service Provider of the Mobile Office Service. This password is used as a master key enabling Remote Controller and Local Manager to generate a common session key that they will use as a shared secret in order to protect the communication between them.

Figure 2:
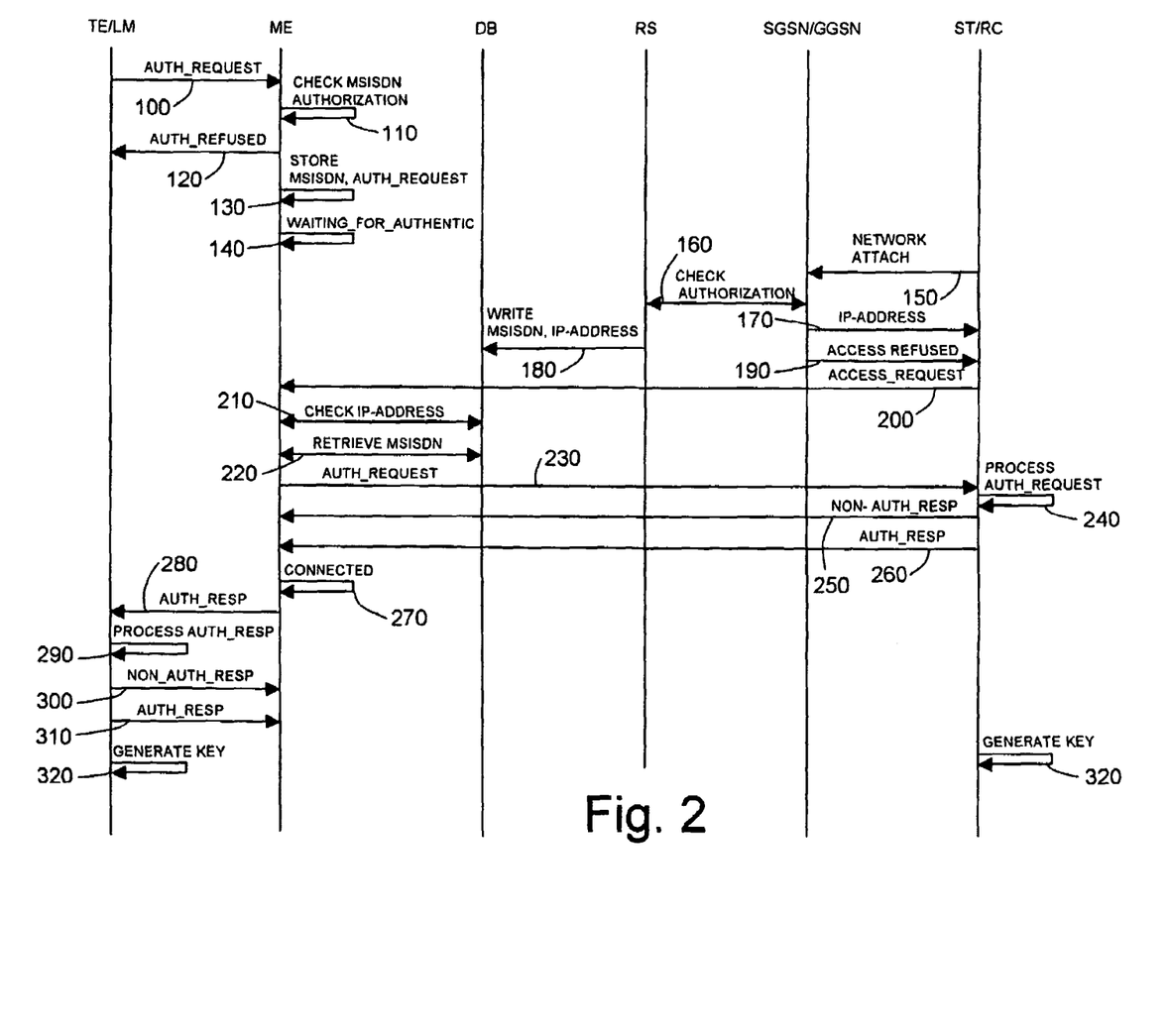
FIG. 2 shows a flowchart of the actions performed by the remote access system, the subscriber terminal and the terminal equipment to enable the user to remotely access the terminal equipment via the subscriber terminal.

FIG. 2 shows commands and responses exchanged by the Remote Access System, the Subscriber Terminal and the Terminal Equipment to enable the user to remotely access the Terminal Equipment via the Subscriber Terminal.

In particular, the user who later wants to remotely access his/her own Terminal Equipment via his/her own Subscriber Terminal has firstly to run the Local Manager on the Terminal Equipment.

When executed, the Local Manager requests a connection of the Terminal Equipment to the Mediator by sending a request for authentication AUTH_REQUEST containing the MSISDN of the Subscriber Terminal which may remotely control the Terminal Equipment, and data encrypted using the password entered by the user in the Terminal Equipment (100). For example, the request for authentication AUTH_REQUEST can have the following format:

$$\text{AUTH\_REQUEST} = (\text{MSISDN}, E_{key=PairingSecret}(\text{Ran-domString1}, \text{Nonce1}, \text{HMAC}_{key=PairingSecret}(\text{Ran-domString1}, \text{Nonce1})))$$

where:
- E is an encryption function and HMAC (Keyed-Hashing for Message Authentication) is a signature function;
- PairingSecret is the password entered by the user in the Terminal Equipment and the corresponding Subscriber Terminal; this password is never transmitted, not even in an encrypted form and it is used both for generating the HMAC (i.e. the signature of the message) and for encrypting the entire message;
- RandomString1 is a random string generated by the Local Manager; and
- Nonce1 is a time-stamp of the message used to prevent reply-attack; whenever the addressee receives a message with a Nonce already received, the message is considered malicious and, potentially, an attack attempt; it is hence up to the sender to use always different Nonce values.

It may be appreciated that only the addressee of the request for authentication AUTH_REQUEST is in clear, i.e., not encrypted. It simply contains the MSISDN of the Subscriber Terminal and it is the only part of the message that the Mediator can read and interpret.

Upon receiving the request for authentication AUTH_REQUEST from the Local Manager, the Mediator extracts the MSISDN, and verifies whether the user is subscribed to the Mobile Office Service by checking if the MSISDN is in a subscriber list (110).

If the user is not subscribed to the Mobile Office Service, the Mediator executes a procedure to reject the request for authentication AUTH_REQUEST (120). This procedure involves sending authentication refusal AUTH_REFUSED to the Local Manager and blocking any connection to the latter. Furthermore, for a given time interval, which can be defined by the Service Provider, the Mediator will not accept any other request for authentication from the IP address associated to the Terminal Equipment on which that Local Manager is installed, in so far as it could be potentially malicious. Once this time interval has elapsed, the procedure can be re-executed by the Local Manager by sending the request for authentication AUTH_REQUEST again, this time hopefully, with proper authorized data.

On the contrary, if the user is subscribed to the Mobile Office Service, the Mediator stores the request for authentication AUTH_REQUEST along with the MSISDN (130) until it receives a request for access ACCESS_REQUEST to the Terminal Equipment from a Subscriber Terminal having the same MSISDN as the one included in the stored request for authentication AUTH_REQUEST. The Mediator also sets the Local Manager to a state WAITING_FOR_AUTHENTICATION, in which the Mediator does not authorize the Local Manager to perform any operation (140).

At this point, when the user wants to remotely access his/her own Terminal Equipment, he/she has firstly to authenticate the Subscriber Terminal with the Mobile Communications Network (150). For example, if the Mobile Communications Network is a GPRS network, the standard "GPRS attach" procedure may be executed requiring the Subscriber Terminal to register itself with a Serving GPRS Support Node (SGSN) via a Gateway GPRS Support Node (GGSN) (both not shown). The Radius Server is the network component that authenticates the Subscriber Terminal by verifying whether it is enabled to access the GPRS network and that notifies the GGSN accordingly (160): if authentication is successful, the GGSN assigns and provides an IP address to the Subscriber Terminal (170) and the Radius Server writes into the Authentication Database information about the authenticated Subscriber Terminal, such as for example the username, the IP address, the MSISDN, etc. (180), whereas if authentication is not successful, the GGSN, which rejects the request for access of the Subscriber Terminal the GPRS network (190). EDGE and UMTS make use of an authentication procedure very similar to that described above.

Then, the Mobile Communications Network assigns the IP address to the Subscriber Terminal, and at this point, the Subscriber Terminal is connected to the Mobile Communications Network and the user's Remote Controller, installed on the Subscriber Terminal, may use the Mobile Communication Network for communicating with the Mediator.

Upon execution, the Remote Controller sends a request for access ACCESS_REQUEST of the Subscriber Terminal to the Mediator (200), which request for access ACCESS_REQUEST includes the IP address provided to the Subscriber Terminal by the Mobile Communications Network.

When the Mediator receives the request for access ACCESS_REQUEST, it authenticates the Subscriber Terminal by verifying whether the Subscriber Terminal is connected to the Mobile Communications Network, i.e., whether the Subscriber Terminal has already been authenticated by the Mobile Communications Network (210). In particular, the authentication is made by verifying whether the IP address of the Subscriber Terminal, which is extracted from the request for access ACCESS_REQUEST, is in the Authentication Database. If authentication is successful, the Mediator grants access to the Subscriber Terminal and retrieves all the other information stored in the Authentication Database and relating to the Subscriber Terminal, including the MSISDN (220).

At this point, the Mediator has acquired mapping between the IP address and the MSISDN of the Subscriber Terminal that has requested access to a Terminal Equipment.

Should the Subscriber Terminal disconnect from the Mobile Communications Network, for example due to a connection block, the Radius Server writes this information into the Authentication Database. The Mediator, being connected to the Authentication Database, is thus informed of this disconnection, and may provide for a better use of the resources by re-allocating the ones no longer used by the Subscriber Terminal, now disconnected.

Once the Subscriber Terminal has been authenticated by the Mediator, the latter forwards the request for authentication AUTH_REQUEST received from the Terminal Equipment to the Subscriber Terminal (230), which processes the request for authentication AUTH_REQUEST in order to authenticate the Terminal Equipment (240). In particular, the Remote Controller on the Subscriber Terminal decrypts the request for authentication AUTH_REQUEST by using the password entered by the user in the Subscriber Terminal, and then re-computes the request for authentication by using the same password. If the password has not been stored, the Remote Controller asks the user to enter it.

If the re-computed request for authentication is different from the one forwarded by the Mediator, or if it contains a value of Nonce that was already received, the Remote Controller does not authenticate the Local Manager and sends to the Mediator a non-authentication notification NON_AUTH_ RESP (250), which Mediator executes a procedure similar to the above-described procedure (120) to reject the request for authentication AUTH_REQUEST.

If, instead, the re-computed for authentication is equal to the one forwarded by the Mediator and it contains a never used value of Nonce, the Remote Controller authenticates the Local Manager and sends to the Mediator an authentication notification AUTH_RESP (260) with the following format:

$$\text{AUTH\_RESP} = (\text{MSISDN}, E_{key=PairingSecret}(\text{RandomString2, Nonce2, HMAC}_{key=PairingSecret}(\text{RandomString2, Nonce2})))$$

where the various fields have the meaning described above.

Once the Mediator has received the authentication notification AUTH_RESP, it promotes the Local Manager from the state WAITING_FOR_AUTHENTICATION to a state CONNECTED (270), and forwards the authentication notification AUTH_RESP to the latter (280), which processes the authentication notification AUTH_RESP in order to authenticate the Subscriber Terminal (290). From this moment on, the Local Manager is authorized to use the Mobile Office Service.

In particular, the Local Manager on the Terminal Equipment decrypts the notification authentication AUTH_RESP in order to extract "RandomString2" by using the password entered by the user in the Terminal Equipment, and then re-computes the notification authentication AUTH_RESP by using the same password.

If the re-computed authentication notification AUTH_RESP is different from the one forwarded by the Mediator, or if it contains a value of Nonce that was already received, the Local Manager does not authenticate the Remote Controller and detects a fraud attempt, logs it and sends to the Mediator a non-authentication notification NON_AUTH_RESP (300).

At this point, the Mediator executes a procedure similar to the above-described procedure (120) to reject the request for access AUTH_ACCESS.

If, instead, the re-computed authentication notification is equal to the one forwarded by the Mediator and it contains a never used value of Nonce, the Local Manager authenticates the Subscriber Terminal and sends to the Mediator an authentication notification AUTH_RESP (310).

At this point, the Remote Controller and the Local Manager, being trusted on each other, generate a common session key by using the two exchanged RandomStrings (320). This common session key will be used, from this moment on, in order to encrypt the entire communication between the Remote Controller and the Local Manager. In a preferred embodiment of the present invention the common session key can be generated by using the following algorithm:

$$K_{sess} = E_{key=PairingSecret}(\text{RandomString1 concatenated RandomString2}).$$

From this moment on, the Remote Controller and the Local Manager may exchange commands and messages via the Mediator at the Mobile Office Centre. These commands and messages are encrypted via the common session key $K_{sess}$.

In conclusion, the Remote Controller connects to the Mediator only if the Subscriber Terminal is authenticated by the Radius Server, whereas the Local Manager connects to the Mediator only if pairing with the Remote Controller, via the Pairing Secret, is successful.

It should be noted that basically the Mediator "trusts" the Remote Controller, whilst it does not "trust" the Local Manager. This is possible thanks to the connection of the Mediator at the Service Centre with the RADIUS Server, connection which guarantees that the Remote Controller is authenticated by the Mobile Network Operator. Therefore, the Mediator delegates authentication of Local Manager to the Remote Controller, and once the authentication is successful, the Remote Controller becomes responsible for the actions of the Local Manager, and the connection of the Subscriber Terminal to the Terminal Equipment may be billed directly on the account associated to the MSISDN of the Subscriber Terminal.

The advantages of the present invention are evident from the foregoing description.

The main advantage is the easily of installation and configuration of the software applications on the Subscriber Terminals and the Terminal Equipments. In fact, the user only installs a first software application on the Subscriber Terminal and a second software application on the Terminal Equipment, and then enters simple credentials upon the first execution of the two software applications, in particular a password on the Subscriber Terminal and the same password and the MSISDN of the Subscriber Terminal on the Terminal Equipment. Then, the connection of the Subscriber Terminal to the Terminal Equipment is automatic and transparent to the user that has not to deal with difficult concepts, such as IP numbers, firewalls configurations, NAT, etc.

Another advantage of the present invention is that the user may remotely access the Terminal Equipment by reusing his/her own Network account and does not have to register at some Service Provider to obtain a new account. This aspect is important because frequently the introduction of new services is delayed owing to the psychological effect that the need to register and open a new account has on the users. The reuse of the Network account of the user further enables billing of the Mobile Office Service on an MSISDN basis.

A further advantage of the present invention is that the mutual authentication of the Subscriber Terminals and the controlled Terminal Equipments is very easy and immediate. In fact, the Subscriber Terminal is authenticated and hence authorized to access the Terminal Equipment via the Network account that the Mobile Communications operator has assigned to the Subscriber Terminal. To access the Terminal Equipment, it will thus be sufficient for the user to provide the Subscriber Terminal with a connection to the Mobile Communication Network (for example GPRS, EDGE, UMTS).

A yet further advantage of the present invention is privacy and security of transferred information. In fact, once the mutual authentication has been carried out, the Subscriber Terminal and the controlled Terminal Equipment can communicate in a confidential and safe way because the exchanged information is not in clear even during transit through the Mediator thanks to the end-to-end encryption of the information using the common session key $K_{sess}$.

Communication during the authentication procedure also occurs in an incorruptible way, because signatures are associated to the exchanged messages and commands and verified by the addressees using the shared passwords, thus verifying the authenticity of the origin of the exchanged messages and commands. Communication during the authentication procedure is also protected against the so-called replay attacks because each exchanged message and command contains a different number (Nonce), and is deemed valid by the addressee only if that number has never been used, thus preventing an hacker from "sniffing" the message and sending it a number of times.

Moreover, the identification of the users based on the MSISDNs enables management of an Access Control List (ACL) containing the authorizations of access to the various directories of the file system of the Terminal Equipment based upon MSISDNs. In other words, a user will be able to grant read access to the file system of his Terminal Equipment for example to all the telephone numbers that are in the "VIP" category of his/her phone book, whilst he/she will be able to grant read/write access to all those in the "family" category.

In addition, the present invention enables remote access to the user Terminal Equipment even when this is located behind a Network Address Translation system and/or dynamic IP address assignment, and is protected by a firewall. In fact, as the Mediator mediates all the communication between the Terminal Equipment and the Subscriber Terminal, these latter two do not need to be directly connected: it is just the Mediator that needs to be reachable, not the Terminal Equipment and Subscriber Terminal.

Furthermore, the Terminal Equipment and the Subscriber Terminal do not need to process incoming connections (that would require proper configuration of the firewall and the NAT) but they only need to initiate a connection with the Mediator.

Moreover, the present invention enables automatic management of modifications of the IP address of the Subscriber Terminal even during the application session. In fact, in the case of modification of the IP address of one of the Subscriber Terminal and the Terminal Equipment (typically the Subscriber Terminal, as a consequence, for example, of a dead spot), the Mediator can simply update the mapping between logical name and IP address in a way that is transparent to the communication between the Terminal Equipment and the Subscriber Terminal, communication that continue to use the same logical names.

Finally, it is clear that numerous modifications and variants can be made to the present invention, all falling within the scope of the invention, as defined in the appended claims.

Figure 3:
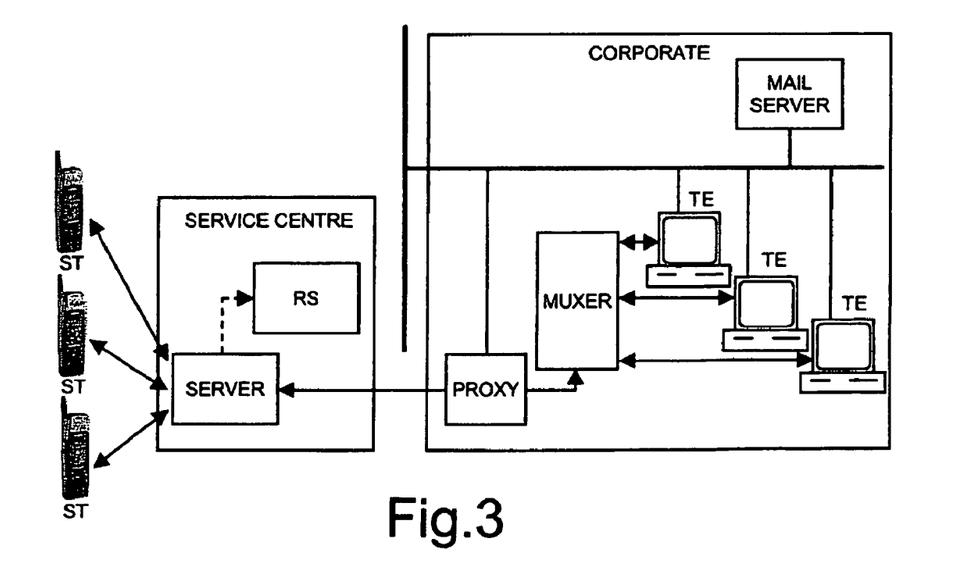
FIG. 3 shows a block diagram of a remote access system according to a different embodiment of the present invention.

In particular, FIG. 3 shows a possible corporate application of the present invention, wherein the Mediator is split into two logical modules:
- a Server module which is hosted at the Service Centre of the Mobile Communications Operator and which interfaces with the Radius Server and handles all the connections to the Subscriber Terminals; and
- a Muxer module which is hosted at the corporate Service Centre and which handles all the connections to the Terminal Equipments. The corporate manager can hence set the most appropriate access rules towards the Terminal Equipments of the corporate network, and the Muxer module will interface with the Server module for communication to the Subscriber Terminals.

In this corporate scenario, the mapping between the Terminal Equipment and the Subscriber Terminal may be carried out automatically by the Local Manager. In fact, it can retrieve the MSISDN of the Subscriber Terminal by querying the corporate database, thus further simplifying the application of the invention in question in so far as the software applications will only ask the user for a password.

The invention claimed is:

1. A remote access method for enabling a user to remotely access terminal equipment from a subscriber terminal via a remote access system, said terminal equipment storing identification data of said subscriber terminal, the identification data comprising MSISDN data, the method comprising:
   receiving a request for authentication from said terminal equipment, said request for authentication comprising said identification data of said subscriber terminal;
   storing said request for authentication until said subscriber terminal has been authenticated by a communications network;
   receiving a request for access to said terminal equipment from said subscriber terminal;
   verifying that said subscriber terminal is subscribed to said remote access system;
   authenticating said subscriber terminal based on information from the communications network;
   forwarding said request for authentication from said terminal equipment to said subscriber terminal, said subscriber terminal processing said request for authentication to authenticate said terminal equipment;
   receiving an authentication notification from said subscriber terminal;
   forwarding said authentication notification from said subscriber terminal to said terminal equipment, said terminal equipment processing said authentication notification to authenticate said subscriber terminal; and
   receiving an authentication notification from said terminal equipment; and
   enabling said subscriber terminal to remotely access said terminal equipment.

2. The remote access method as claimed in claim 1, wherein authenticating said subscriber terminal based on information from said communications network comprises:
   verifying that said subscriber terminal has been previously authenticated by said communications network.

3. The remote access method as claimed in claim 2, wherein verifying that said subscriber terminal has been previously authenticated by said communications network comprises:
   verifying that said identification data of said subscriber terminal has been stored by said communications network in a database.

4. The remote access method as claimed in claim 1, wherein said identification data comprises at least a mobile subscriber international integrated services digital network number of said subscriber terminal.

5. The remote access method as claimed in claim 1, wherein verifying that said subscriber terminal is subscribed to said remote access system comprises:
   extracting said identification data of said subscriber terminal from said request for authentication; and
   verifying that said extracted identification data are associated with a subscriber of said remote access system.

6. A remote access method as claimed in claim 5, further comprising:
   rejecting said request for authentication if said identification data are not associated with a subscriber of said remote access system.

7. The remote access method as claimed in claim 6, further comprising:
   sending an authentication refusal to said terminal equipment if said identification data are not associated with a subscriber of said remote access system.

8. The remote access method as claimed in claim 6, further comprising:
   rejecting any subsequent request for authentication from said terminal equipment for a time span if said identification data are not associated with a subscriber of said remote access system.

9. The remote access method as claimed in claim 1, wherein said request for authentication from said terminal equipment comprises data encrypted using user access credentials entered in said terminal equipment, and wherein said subscriber terminal authenticates said terminal equipment based on said encrypted data in said request for authentication.

10. The remote access method as claimed in claim 9, wherein authenticating said terminal equipment based on said encrypted data comprises:
    decrypting said encrypted data in said request for authentication by using access credentials entered in said subscriber terminal;
    encrypting said decrypted data using said user access credentials entered in said subscriber terminal;
    comparing said encrypted data in said request for authentication with said data encrypted using said user access credentials entered in said subscriber terminal; and
    authenticating said terminal equipment if said comparison has a positive outcome.

11. The remote access method as claimed in claim 9, further comprising:
    rejecting said request for authentication upon receiving a non-authentication notification from said subscriber terminal.

12. The remote access method as claimed in claim 11, further comprising:
    sending an authentication refusal to said terminal equipment upon receiving a non-authentication notification from said subscriber terminal.

13. The remote access method as claimed in claim 11, further comprising:
    rejecting any subsequent request for authentication from said terminal equipment for a time span upon receiving said non-authentication notification from said subscriber terminal.

14. The remote access method as claimed in claim 1, wherein said authentication notification from said subscriber terminal comprises data encrypted using access credentials entered in said subscriber terminal, and wherein said terminal equipment authenticates said subscriber terminal based on said encrypted data in said authentication notification.

15. The remote access method as claimed in claim 14, wherein authenticating said subscriber terminal based on said encrypted data in said authentication notification comprises:
    decrypting said encrypted data in said authentication notification by using said access credentials entered in said terminal equipment;
    encrypting said decrypted data using said access credentials entered in said terminal equipment;
    comparing said encrypted data in said authentication notification with said data encrypted using said access credentials entered in said terminal equipment; and
    authenticating said subscriber terminal if said comparison has a positive outcome.

16. The remote access method as claimed in claim 14, further comprising:
    rejecting said request for access upon receiving a non-authentication notification from said terminal equipment.

17. The remote access method as claimed in claim 16, further comprising:
    sending an authentication refusal to said subscriber terminal upon receiving said non-authentication notification from said terminal equipment.

18. The remote access method as claimed in claim 16, further comprising:
    rejecting any subsequent request for access from said subscriber terminal for a time span upon receiving said non-authentication notification from said terminal equipment.

19. The remote access method as claimed in claim 1, wherein said remote access system stores an access control list containing access authorizations for different subscriber terminals, each access authorization specifying resources of said terminal equipment to which a corresponding subscriber terminal may access; and wherein enabling said subscriber terminal to remotely access said terminal equipment comprises:
    determining the access authorization associated with said subscriber terminal in said access control list; and
    enabling said subscriber terminal to access the resources of said terminal equipment specified in said access authorization.

20. A remote access system comprising a processor and a memory, for enabling a user to remotely access terminal equipment from a subscriber terminal, said subscriber terminal, said terminal equipment and said remote access system implementing the remote access method according to claim 1.

21. Software modules, stored on one or more nontransitory computer readable media associated with terminal equipment, a subscriber terminal, and a remote access system, for enabling a user to remotely access said terminal equipment from said subscriber terminal capable of cooperating in implementing the remote access method according to claim 1.

22. A mobile office service method for enabling a user to remotely control terminal equipment from a subscriber terminal via a remote access system, said terminal equipment storing identification data of said subscriber terminal, the identification data comprising MSISDN data, said mobile office service method comprising:
    generating a request for authentication at said terminal equipment, said request for authentication comprising said identification data of said subscriber terminal;
    sending said request for authentication from said terminal equipment to said remote access system;
    storing at said remote access system, said request for authentication until said subscriber terminal has been authenticated by a communications network;

generating at said subscriber terminal a request for access to said terminal equipment;
sending said request for access from said subscriber terminal to said remote access system;
verifying at said remote access system that said subscriber terminal is subscribed to said remote access system;
authenticating at said remote access system said subscriber terminal based on information from the communications network;
sending said request for authentication to said subscriber terminal;
processing at said subscriber terminal said request for authentication to authenticate said terminal equipment;
generating an authentication notification at said subscriber terminal;
sending said authentication notification from said subscriber terminal to said terminal equipment via said remote access system;
processing at said terminal equipment said authentication notification to authenticate said subscriber terminal; and
establishing a secure communication between said subscriber terminal and said terminal equipment.

23. The mobile office service method as claimed in claim 22, wherein establishing a secure communication comprises:
generating a common session key at said subscriber terminal and said terminal equipment; and
encrypting communication between said subscriber terminal and said terminal equipment by using said common session key.

24. The mobile office service method as claimed in claim 22, wherein said remote access system stores an access control list containing access authorizations for different subscriber terminals, each access authorization specifying resources of said terminal equipment to which a subscriber terminal may access; and wherein establishing a secure communication comprises:
determining the access authorization associated with said subscriber terminal in said access control list; and
enabling said subscriber terminal to access the resources of said terminal equipment specified in said access authorization.

* * * * *